US010757355B2

(12) United States Patent
Fenigstein et al.

(10) Patent No.: US 10,757,355 B2
(45) Date of Patent: Aug. 25, 2020

(54) IMAGE SENSOR MODULE AND A METHOD FOR SENSING

(71) Applicant: Tower Semiconductor LTD., Migdal Haemek (IL)

(72) Inventors: Amos Fenigstein, Haifa (IL); Tomer Leitner, Nahariya (IL)

(73) Assignee: TOWER SEMICONDUCTORS LTD., Migdal-Haemek (IL)

( * ) Notice: Subject to any disclaimer, the term of this patent is extended or adjusted under 35 U.S.C. 154(b) by 0 days.

(21) Appl. No.: 16/048,435

(22) Filed: Jul. 30, 2018

(65) Prior Publication Data

US 2020/0036922 A1    Jan. 30, 2020

(51) Int. Cl.
*H04N 5/374*  (2011.01)
*H04N 5/378*  (2011.01)

(52) U.S. Cl.
CPC ............ *H04N 5/374* (2013.01); *H04N 5/378* (2013.01)

(58) Field of Classification Search
CPC ...... H04N 5/374; H04N 5/378; H04N 5/2256; H04N 5/2354; G03B 15/02–05; G03B 2215/05–0596; F21K 5/023; F21K 5/026; G06K 2209/401
See application file for complete search history.

(56) References Cited

U.S. PATENT DOCUMENTS

| | | | | |
|---|---|---|---|---|
| 7,923,695 B2 * | 4/2011 | Ishii | ................. | H01L 27/14658 250/370.08 |
| 2011/0150183 A1 * | 6/2011 | Wu | ...................... | A61B 6/032 378/98.9 |
| 2015/0350584 A1 * | 12/2015 | Fenigstein | ............. | H04N 5/355 250/208.1 |
| 2016/0143603 A1 * | 5/2016 | Hoffman | ................ | A61B 6/482 378/5 |
| 2016/0363674 A1 * | 12/2016 | Jacob | ...................... | G01T 1/247 |
| 2017/0172528 A1 * | 6/2017 | Wiedmann | ............. | A61B 6/482 |

* cited by examiner

*Primary Examiner* — Abdelaaziz Tissire
(74) *Attorney, Agent, or Firm* — Reches Patents

(57) ABSTRACT

A system that may include (a) a radiation source that is constructed and arranged to illuminate an object with radiation during consecutive time frames of microsecond-scale duration, wherein radiation emitted during one time frame differs by energy from radiation transmitted during an adjacent time frame; and (b) a CMOS sensor that may include a readout circuit and CMOS pixels. Each CMOS pixel may include a radiation sensing element and in-pixel memory elements. Different in-pixel memory elements are constructed and arranged to sample a state of the radiation sensing element during different time frames of the consecutive time frames.

19 Claims, 11 Drawing Sheets

IMAGE SENSOR MODULE AND A METHOD FOR SENSING

BACKGROUND OF THE INVENTION

X-ray imaging is based on difference of X-ray transmission between different body tissues. X-ray imaging can be done with different X-ray photon energies, usually between 20 keV to 150 keV which are optimized for certain cases.

Combination of images obtained at different x-ray illumination energies can be of advantage. For instance, some tissues, especially soft tissues have quite small differences in transmission.

It may be beneficial to acquire different x-ray images with different X-ray illumination energies. The different images may provide information on different soft tissues.

However, due to body movement the different images cannot be fused correctly.

An alternative is a concurrent illumination the body with two x-rays beams with different energies. The sensing is done with two stacked scintillators separated by a filter, with photomultipliers aside. The first scintillator detects low energies, while the second one only the more energetic X-rays. This solution suffers from a poor spectral separation and high cost There is a growing need to provide a system and method for acquiring different x-ray images obtained at different x-ray illumination x-ray energy in a manner that will enable to fuse the different x-ray images.

SUMMARY

According to an embodiment of the invention there may be provided a system that may include a radiation source that may be constructed and arranged to illuminate an object with radiation during consecutive time frames of microsecond-scale duration, wherein radiation emitted during one time frame differs by energy from radiation transmitted during an adjacent time frame; and a CMOS sensor that may include a readout circuit and CMOS pixels. Each CMOS pixel may include a radiation sensing element and in-pixel memory elements. Different in-pixel memory elements may be constructed and arranged to sample a state of the radiation sensing element during different time frames of the consecutive time frames. The readout circuits may be constructed and arranged to read the in-pixel memory elements of the CMOS pixels during one or more read periods.

There may be provided a CMOS sensor may include multiple CMOS pixels, one or more column current sources, and a readout circuit. Each CMOS pixel may include a radiation sensing element, an in-pixel current source, and in-pixel memory elements. for each CMOS pixel, different in-pixel memory elements may be constructed and arranged to sample a state of the radiation sensing element during different time frames of consecutive time frames of microsecond scale duration. For each CMOS pixel, the in-pixel current source may be constructed and arranged to supply current to the different in-pixel memory elements during a sampling of the state of the radiation sensing element. The readout circuits may be constructed and arranged to read the in-pixel memory elements of the CMOS pixels during one or more read periods. The one or more column current sources that may be construed and arranged to supply current to each column of CMOS pixels while CMOS pixels of the column of CMOS pixels may be read. The CMOS sensor may be constructed and arranged to deactivate each in-pixel current source during the one or more read periods.

The radiation source may be constructed and arranged to illuminate the object by spaced apart radiation pulses, one radiation pulse per time frame.

The radiation source may be constructed and arranged to illuminate the object by a ramp of changing energy levels during the consecutive time frames.

The radiation may be an x-ray radiation.

The radiation may differ from x-ray radiation.

The each CMOS pixel may include an in-pixel current source that may be constructed and arranged to supply current to the different in-pixel memory elements during a sampling of the state of the radiation sensing element.

The CMOS sensor may be constructed and arranged to deactivate each in-pixel current source during the one or more read periods.

The CMOS sensor may include one or more column current sources that may be construed and arranged to supply current to each column of CMOS pixels while CMOS pixels of the column of CMOS pixels may be read.

Each column current source may be constructed and arranged to supply a column current that may be stronger by a factor of at least one hundred than a current supplied by each in-pixel current source.

The in-pixel memory elements may be coupled in parallel to each other; and wherein each in-pixel memory element may include an input capacitor and an output switch.

Each pixel may include (a) an input switch that may be coupled between the radiation sensing element and the in-pixel memory elements; (b) a reset branch that may be coupled in parallel to the in-pixel memory elements, and (c) an linear amplifier.

The linear amplifier may include an amplifier CMOS transistor. A gate of the amplifier CMOS transistor may be coupled to an output of the input switch, to an input of the reset branch, and to inputs of the in-pixel memory elements. A drain or a source of the amplifier CMOS transistor may be coupled to outputs of the memory elements, to an output of the reset branch and to the in-pixel current source.

The readout circuit may be constructed and arranged to perform interleaved reading of (a) the in-pixel memory elements of the CMOS pixels and of (b) the CMOS pixels when the in-pixel memory elements may be disconnected.

A method for acquiring multiple images of an object, the method may include illuminating, by a radiation source, an object with radiation during consecutive time frames of microsecond-scale duration, wherein radiation emitted during one time frame differs by energy from radiation transmitted during an adjacent time frame; sensing the radiation by radiation sensing elements of multiple CMOS pixel; for each CMOS pixel of the multiple CMOS pixels, sampling, by different in-pixel memory elements of the CMOS pixel, a state of the radiation sensing element during different time frames of the consecutive time frames; and reading, by the readout circuits, the in-pixel memory elements of the CMOS pixels during one or more read periods.

The method may include supplying, by an in-pixel current source of each CMOS pixel, supply current to the different in-pixel memory elements of the CMOS pixel during a sampling of the state of the radiation sensing element.

The method may include deactivating, by each CMOS pixel, each in-pixel current source during the one or more read periods.

The method may include supplying, to each column of CMOS pixels, current from a column current source during a reading of CMOS pixels of a column of CMOS pixels.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
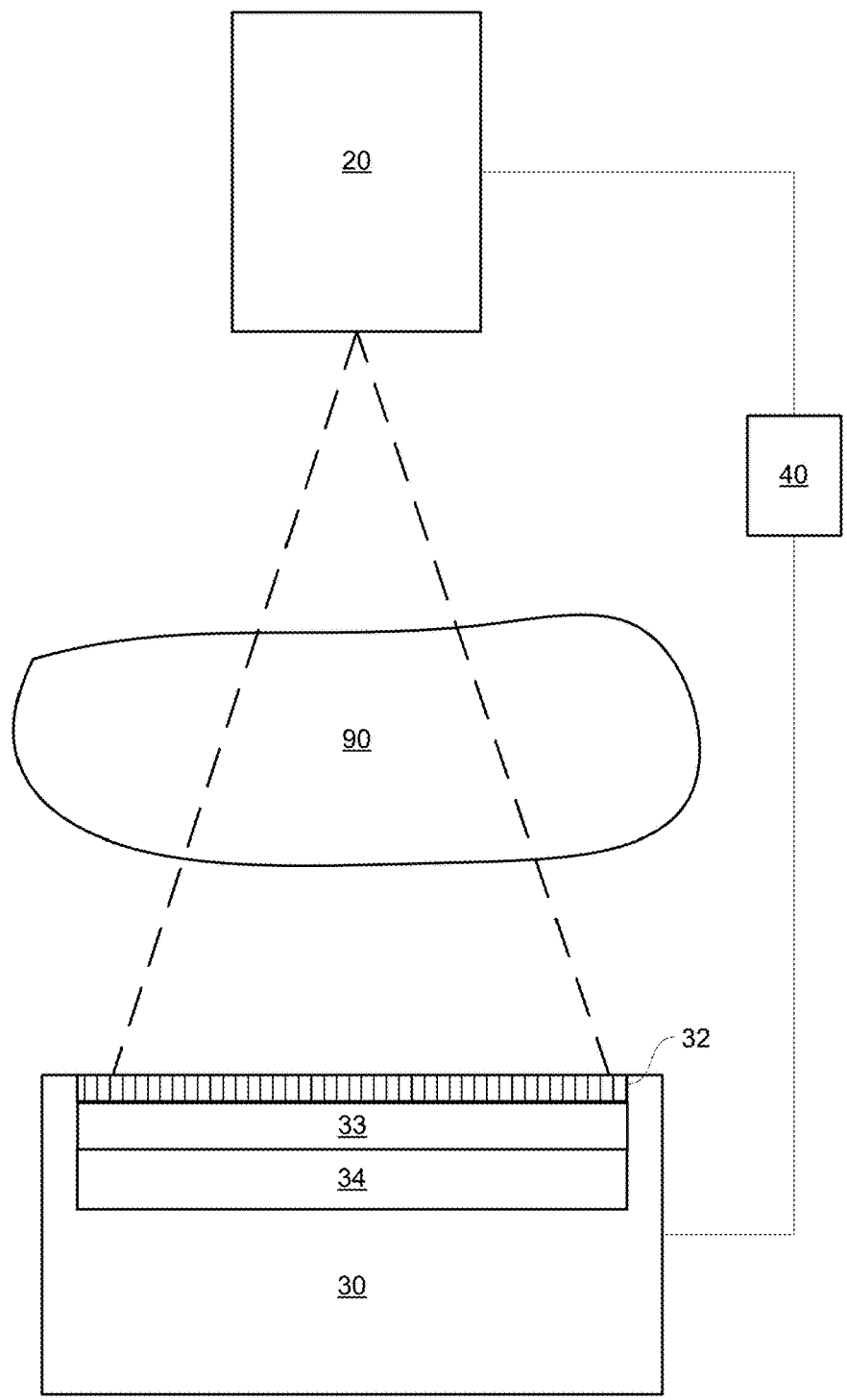
FIG. 1 is example of a system and an object.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Some of the following explanations refer to x-ray. It should be noted that x-ray is a non-limiting example of radiation. The systems and methods illustrated below are applicable to any other type of radiation in order to acquire images of different energies where illumination in different energies can for different image and the fusion of the images can give more informative picture.

FIG. 1 illustrates an example of a system 10 and an object 90.

System 10 includes a radiation source 20, CMOS sensor 30, and a controller 40.

Controller 40 is constructed and arranged to control the operation of the system 10. The controller 40 may include one or more semiconductors chips, one or more dedicated controllers, a processor programmed to operate as a controller, and the like.

The radiation source 20 is constructed and arranged to illuminate object 90 with radiation during consecutive time frames of microsecond-scale duration. The micro-second-scale duration may be below one microsecond, may be about one micro-second, may range between 1 and 20 microseconds, may range between 0.1 and 50 microseconds, and the like.

The radiation emitted during one time frame differs by energy from radiation transmitted during an adjacent time frame.

For example—the radiation source 20 may be constructed and arranged to generate pulses of radiation. Where the pulses have a microsecond-scale duration and wherein adjacent pulses are spaced apart from each other by a microsecond-scale gap.

Yet for another example—the radiation source may output a continuous radiation that exhibits a rapid change of intensity—for example a ramp.

The radiation source may be an x-ray source with a cold cathode. A non-limiting example of an radiation source is illustrated in U.S. Pat. No. 9,922,793B2 which is incorporated herein by reference.

The radiation source may include optics and/or any other components for generating the radiation, shaping the radiation and/or setting any parameter (shape, size, collimation, polarization, frequency, duration) of the radiation.

The CMOS sensor 30 includes a readout circuit 34, column current sources 33 and CMOS pixels 32.

The CMOS pixels 32 may be arranged in an manner—for example in an ordered manner, in an unordered manner, and the like. For simplicity of explenation it is assumed that the CMOS pixels are arranged in rows and columns and that the readout circuits 34 reads pixels, one column at a time—thereby applying a global shutter.

Each CMOS pixel may include a radiation sensing element and in-pixel memory elements. The radiation sensing element may be a photodiode or any other radiation sensing element.

In each CMOS pixel, different in-pixel memory elements are constructed and arranged to sample a state of the radiation sensing element during different time frames of the consecutive time frames. The state of the radiation sensing element represents the radiation sensed by the radiation sensing element. The state of the radiation sensing element may reflect the charge stored in the radiation sensing element, a current outputted by the radiation sensing element, an output voltage of the radiation sensing element, and the like.

Assuming that each CMOS pixel includes a plurality (Q) of in-pixel memory elements, then the status of the radiation sensing element during each one of P consecutive time frames (of microsecond-scale duration) may be samples in the P in-pixel memory elements—one status per time frame.

Accordingly—the combination of CMOS pixels and the radiation source allows to acquire Q different images within Q consecutive time frames of microsecond-scale duration.

The in-pixel memory elements of the CMOS pixels may be read in any manner—during one or more read periods—for example one column of CMOS pixels after the other. Within each column—one in-pixel memory element is read after the other.

There may be any number of CMOS pixels per CMOS sensor. For example—each CMOS sensor may include a large number of CMOS pixels—for example 1000 by 1000 CMOS pixels—and even more.

The sampling of the status of the radiation sensing element requires current (hereinafter—"sampling current").

The distance between the CMOS pixel and the current source that may supply the sampling current impacts the intensity of the sampling current—as higher distances require stronger sampling currents—to overcome propagation losses. Furthermore—the sampling current should be supplied simultaneously to all CMOS pixels.

It has been found that supplying a sampling current, simultaneously, to a large number of CMOS pixels by one or more current source that are external to the CMOS pixels—is very problematic—thereby the CMOS pixels include in-pixel current sources for supplying the sampling current.

An in-pixel current source may be activated during the sampling and may or may not be deactivated during read periods.

The readout circuit does not read the entire CMOS pixels simultaneously, rather reads the CMOS pixels in a sequential manner. In addition, the current required to read a CMOS pixel (hereinafter—reading current) may be stronger (for example by a factor that may range between 2 and 200) from the sampling current.

Therefore—it may be beneficial to read the CMOS pixels using a current source that is located outside the CMOS pixels—thereby preventing the duplication of a bulky current sources per CMOS pixel.

It is assumed, for simplicity of explanation, that the external current source is a column current source that provides the read current to a column of CMOS pixels during one or more readout period.

The in-pixel memory elements may be coupled to each other in any manner.

The in-pixel memory elements may be coupled in parallel to each other. Each in-pixel memory element may include an input capacitor and an output switch.

Each pixel may include an input switch that is coupled between the radiation sensing element and the in-pixel memory elements, a reset branch that is coupled in parallel to the in-pixel memory elements, and an amplifier or switch such as a linear amplifier.

Figure 2:
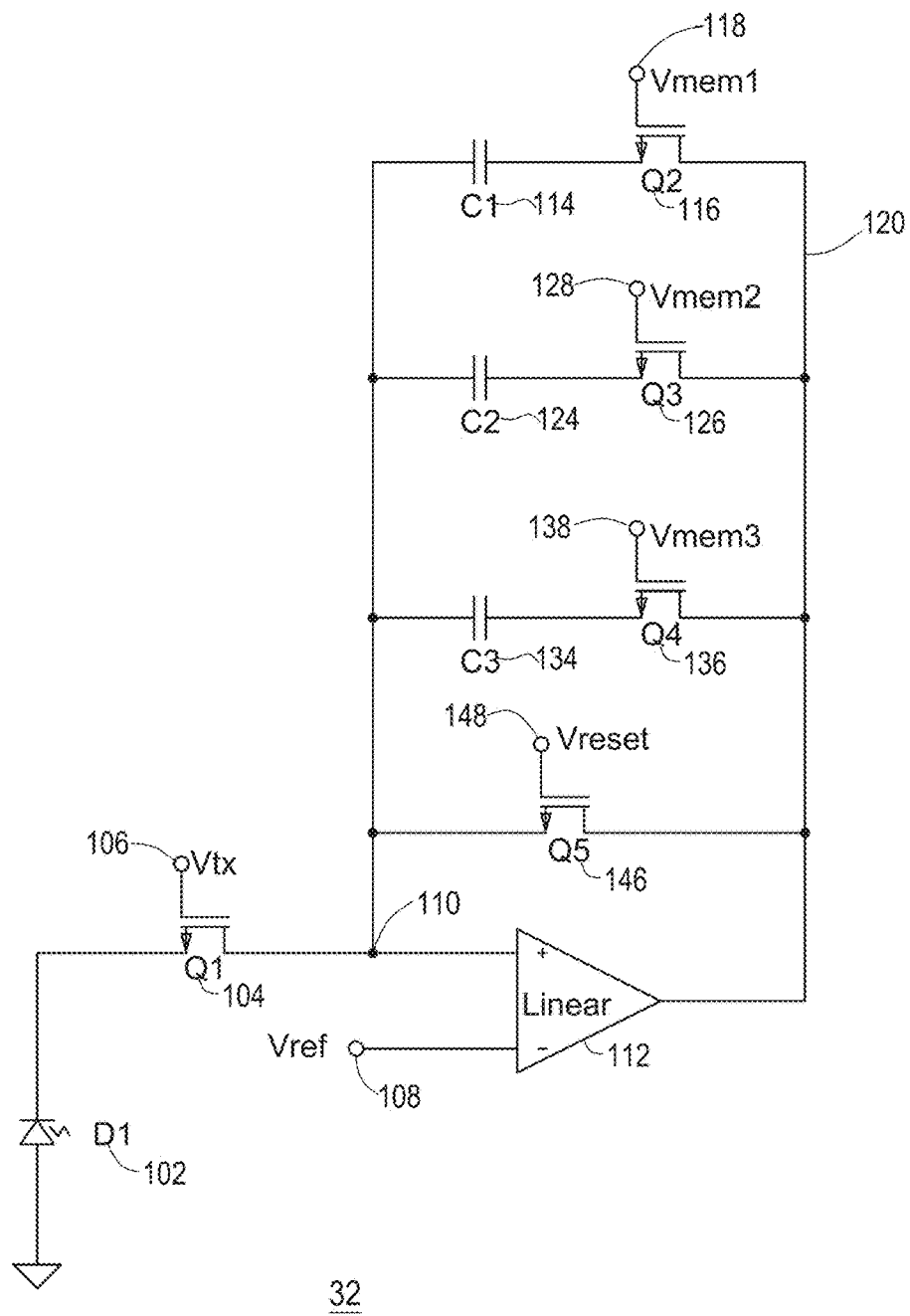
FIG. 2 is an example of a pixel.

FIG. 2 illustrates a CMOS pixel 32 that includes three in-pixel memory elements. There may be any other number of in-pixel memory elements per CMOS pixel.

A radiation sensing element such as photodiode 102 is connected to one port of an input switch (CMOS transistor Q1 104 having a gate 108 that is fed by control signal Vtx 103).

The other port of the input switch is connected to first node 110.

First node 110 is also connected to a first input of liner amplifier 112, an input of a reset branch (reset CMOS transistor Q5 146 that includes a gate 148 that is fed by control signal Vreset), and to inputs of three in-pixel memory elements. The second port 108 of the liner amplifier 112 is fed by a reference voltage Vref.

Each in-pixel memory element includes an input capacitor (114, 124, 134 respectively) and an output switch (CMOS transistors Q2 116, Q3 126 and Q4 136 that have gates 118, 128 and 138 respectively that are fed by control signals Vmem1, Vmem2 and Vmem3 respectively).

The outputs of the reset branch, the output of linear amplifier 112 and the outputs of output switches (CMOS transistors Q2 116, Q3 126 and Q4 136) are coupled to second node 120.

The CMOS pixel 32 may or may not include an in-pixel current source.

Figure 3:
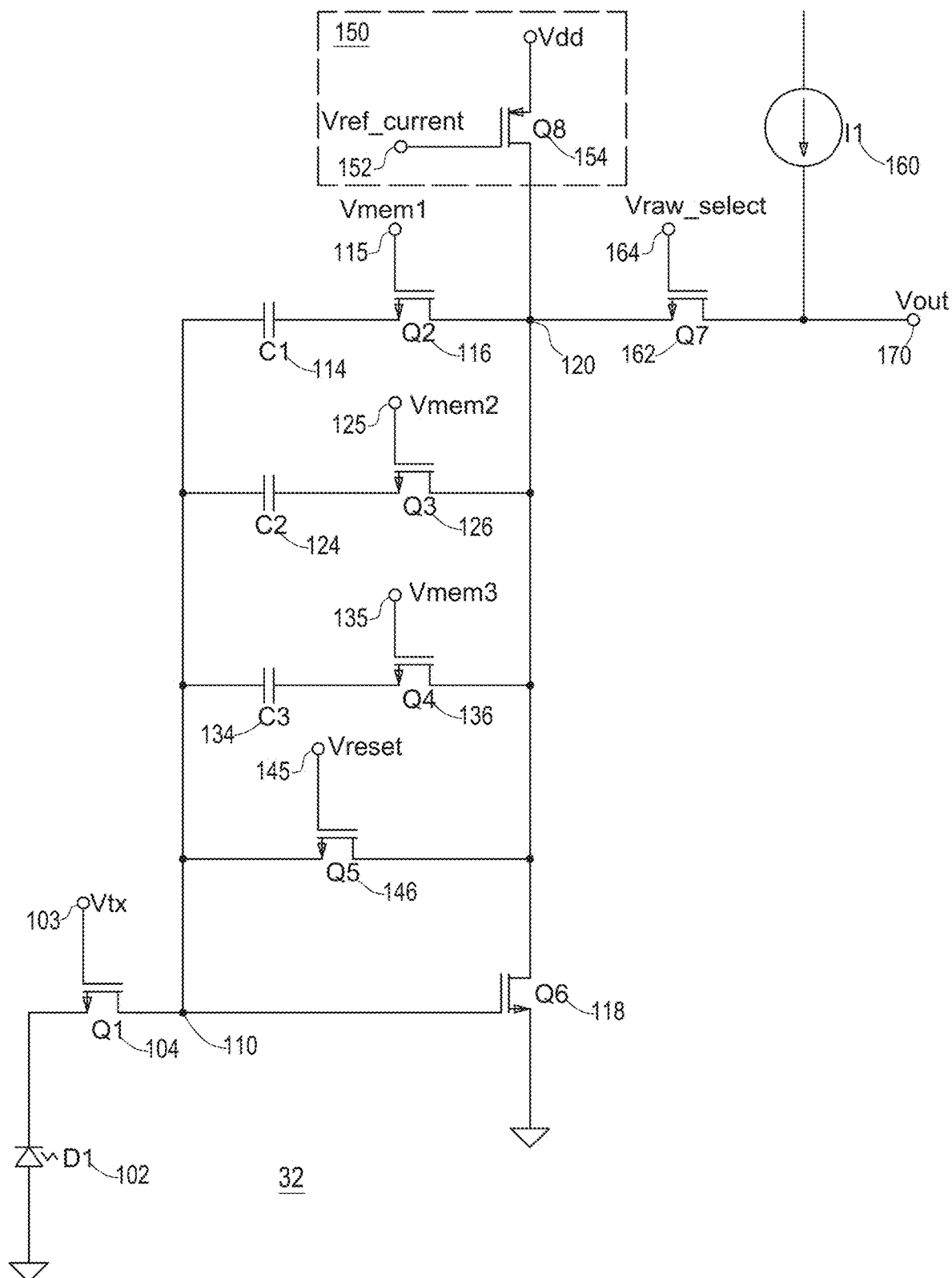
FIG. 3 is an example of a pixel.

FIG. 3 illustrates a CMOS pixel 32 that includes three in-pixel memory elements. There may be any other number of in-pixel memory elements per CMOS pixel.

A radiation sensing element such as photodiode 102 is connected to one port of an input switch (CMOS transistor Q1 104 having a gate 108 that is fed by control signal Vtx 103).

The other port of the input switch is connected to first node 110.

First node 110 is also connected to a gate of an amplifier CMOS transistor Q6 118, to an input of a reset branch (reset CMOS transistor Q5 146 that includes a gate 148 that is fed by control signal Vreset 145), and to inputs of three in-pixel memory elements. The second port 108 of the liner amplifier 112 is fed by a reference voltage Vref.

Each in-pixel memory element includes an input capacitor (114, 124, 134 respectively) and an output switch (CMOS transistors Q2 116, Q3 126 and Q4 136 that have gates 118, 128 and 138 respectively that are fed by control signals Vmem1 115, Vmem2 125 and Vmem3 135 respectively).

The outputs of the reset branch, the source of amplifier CMOS transistor 118 and the outputs of output switches are coupled to second node 120.

CMOS pixel 32 is illustrated as including an in-pixel current source 150 that may include current source CMOS transistor Q8 154 that is connected between voltage supply Vdd and second node 120. Current source CMOS transistor Q8 154 has a gate 152 that is fed by control signal Vref_Current 153.

FIG. 3 also illustrates a column current supply I1 160 that is coupled to a column of CMOS pixels that includes CMOS pixel 32—and is coupled to the CMOS pixel via row select switch (row select CMOS transistor Q7 162 that has a gate 164 that is fed by control signal Vrow_select 161).

The CMOS pixels of FIGS. 2 and 3 may reset the photodiode by opening the input switch and either liner amplifier 112 of FIG. 2 or amplifier CMOS transistor Q6 of FIG. 3.

Each in-pixel memory element may sample the status of the photodiode by having the input switch, the switch of the in-pixel memory element, and either liner amplifier 112 of FIG. 2 or amplifier CMOS transistor Q6 of FIG. 3, open. The sampling may end when the switch of the in-pixel memory element is closed (disconnected).

Different in-pixel memory elements sample the photodiode at different time frames.

The CMOS pixel may operate in a double sampling mode that involves additional read operations that occur while all the in-pixel memory elements are disconnected.

The reset branch may be used to reset the CMOS pixel before each integration period, and before each read operation.

Figure 4:
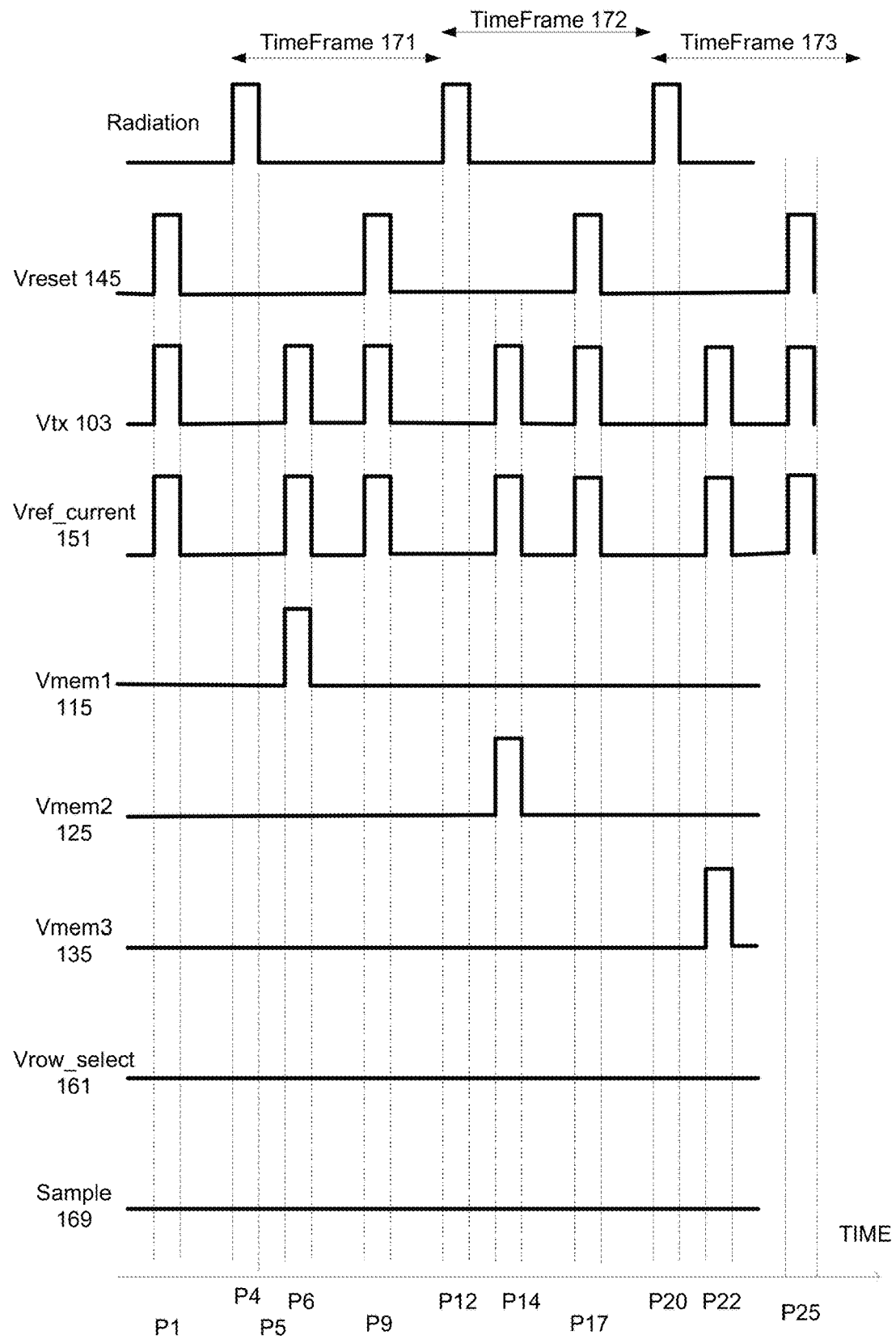
FIG. 4 is an example of a timing diagram.
Figure 5:
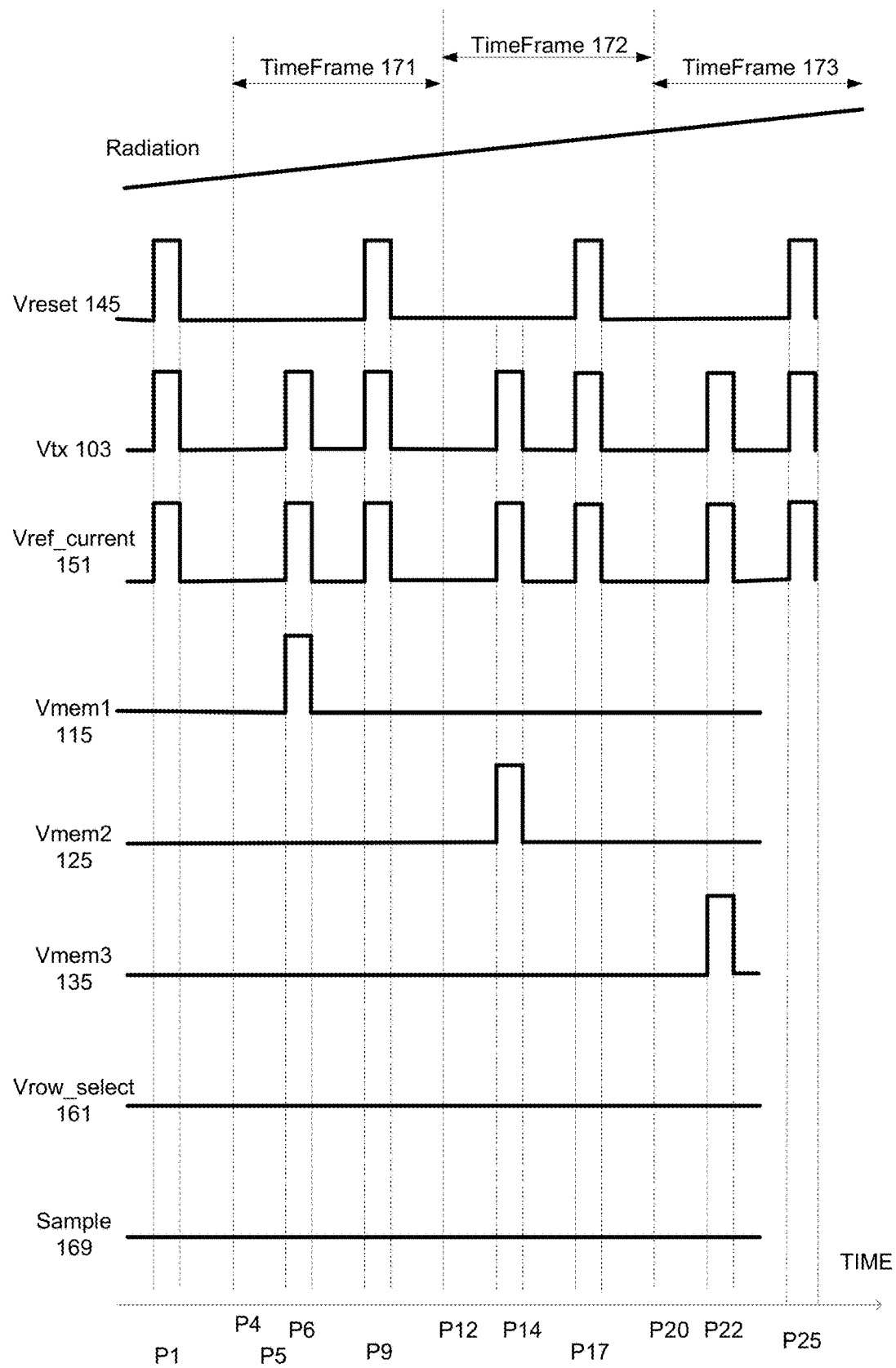
FIG. 5 is an example of a timing diagram.
Figure 6:
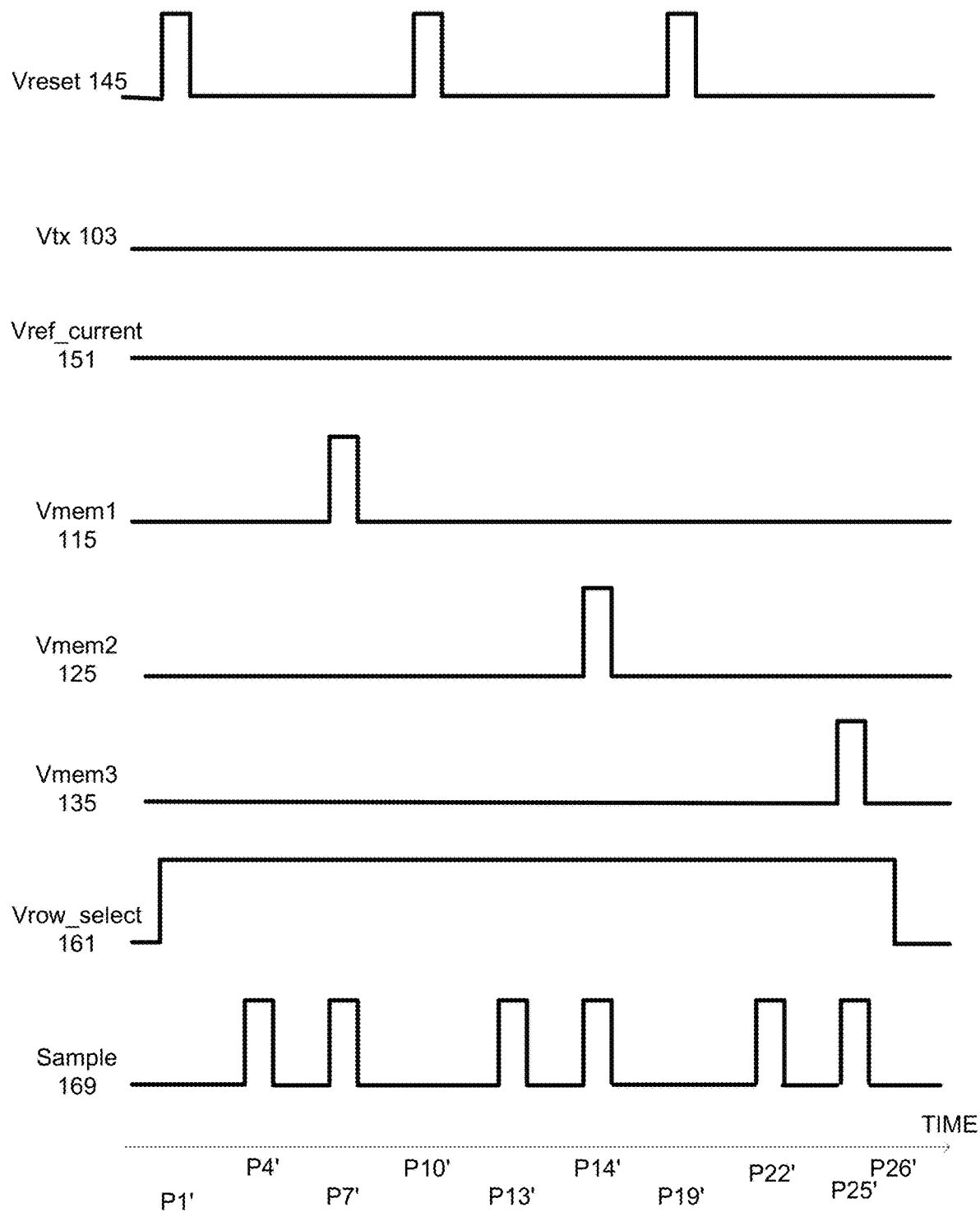
FIG. 6 is an example of a timing diagram.

FIGS. 4, 5 and 6 are examples of timing diagrams of various control signals of a CMOS pixel.

FIG. 4 illustrates three time frames 171, 172, 173 during which three radiation pulses are generated.

During period P0 the photodiode is reset through a path that includes input switch (Q1 104), CMOS reset transistor (Q5 146) and amplifier CMOS transistor (Q6 118). Accordingly—during P0, Verset 145, Vtx 103 and Vref_current 151 are set.

During period P4 (within time frame 171) the first pulse of radiation is received by the photodiode.

During period P6 the first memory branch samples the status of the photodiode—via a path that includes input switch (Q1 104), first output CMOS transistors (Q2 116) and amplifier CMOS transistor (Q6 118). Accordingly—during P6 (within time frame 171) Vmem1 115, Vtx 103 and Vref_current 151 are set.

During period P9 the photodiode is reset through a path that includes input switch (Q1 104), CMOS reset transistor (Q5 146) and amplifier CMOS transistor (Q6 118). Accordingly—during P9, Verset 145, Vtx 103 and Vref_current 151 are set.

During period P12 (within time frame 172) the second pulse of radiation is received by the photodiode.

During period P14 the second memory branch samples the status of the photodiode—via a path that includes input switch (Q1 104), second output CMOS transistors (Q3 126) and amplifier CMOS transistor (Q6 118). Accordingly—during P6 (within time frame 172) Vmem2 125, Vtx 103 and Vref_current 151 are set.

During period P17 the photodiode is reset through a path that includes input switch (Q1 104), CMOS reset transistor (Q5 146) and amplifier CMOS transistor (Q6 118). Accordingly—during P9, Verset 145, Vtx 103 and Vref_current 151 are set.

During period P20 (within time frame 173) the third pulse of radiation is received by the photodiode.

During period P22 the third memory branch samples the status of the photodiode—via a path that includes input switch (Q1 104), third output CMOS transistors (Q4 136) and amplifier CMOS transistor (Q6 118). Accordingly—during P6 (within time frame 173) Vmem3 135, Vtx 103 and Vref_current 151 are set.

FIG. 5 illustrates a radiation ramp that is transmitted during the three time frames 171, 172, 173.

FIG. 6 illustrates three read period during which the first, second and third in-pixel memory elements are read—one after the other. Because of the double sampling applied by the CMOS pixel—each reading of an in-pixel memory element if followed (or preceded) by a reading of the CMOS pixel when the in-pixel memory elements are disconnected.

The reading of the three in-pixel memory elements occurs during periods P1' till P26'. During these periods the row select CMOS transistor Q7 162 is open—thus Vrow_select 161 is set.

During P1' the output of the CMOS pixel is reset—thus Vrerst 145 is set.

During period P4' the CMOS pixel is read while all in-pixel memory elements are disconnected—accordingly a SAMPLE signal 169 (for reading the CMOS pixel) is set.

During P7' the first in-pixel memory element is read—thus Vmem1 115 and SAMPLE 169 are set.

During P10' the output of the CMOS pixel is reset—thus Vrerst 145 is set.

During period P13' the CMOS pixel is read while all in-pixel memory elements are disconnected—accordingly a SAMPLE signal is set.

During P14' the second in-pixel memory element is read—thus Vmem2 125 and SAMPLE 169 are set.

During P19' the output of the CMOS pixel is reset—thus Vrerst 145 is set.

During period P22' the CMOS pixel is read while all in-pixel memory elements are disconnected—accordingly a SAMPLE signal is set.

During P25' the third in-pixel memory element is read—thus Vmem3 135 and SEMPLE are set.

Figure 7:
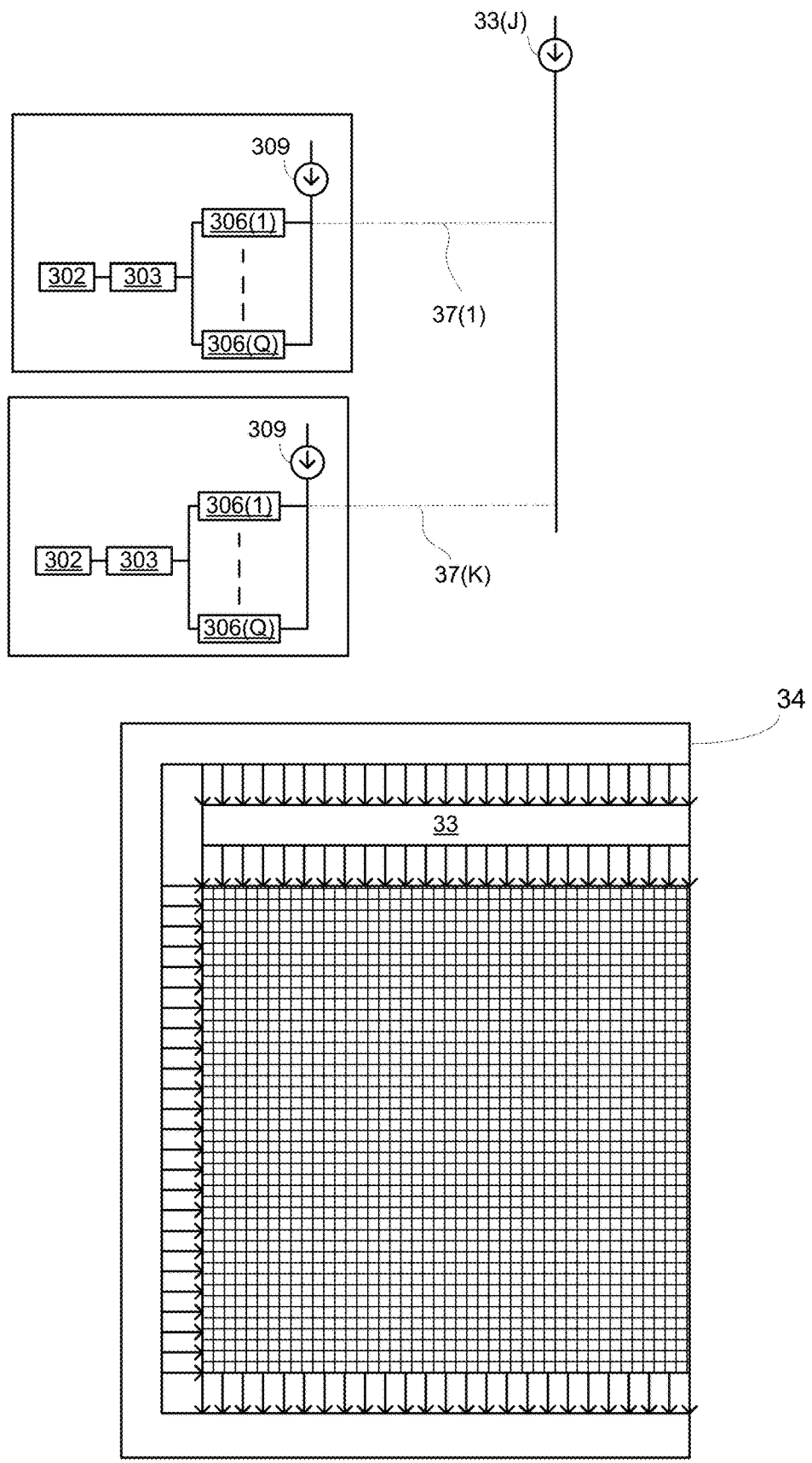
FIG. 7 is an example of a CMOS sensor.

FIG. 7 is an example of a readout circuit 34, a column current sources 33 and CMOS pixels 32.

The readout circuit 34 may be coupled to the rows and columns of the CMOS pixels 32.

FIG. 7 also illustrates a column of pixels that are coupled via row select circuits 37(1)-37(K) to a column current source 33(J), whereas each CMOS pixel is illustrates as including a radiation sensing element 301, a sampling circuits 303 and multiple in-pixel memory elements 306(1)-306(Q), and an in-pixel current source 309.

The various control signals that control the operation of the CMOS pixels may be generated by the readout circuits, and/or by another controller (not shown).

Figure 8:
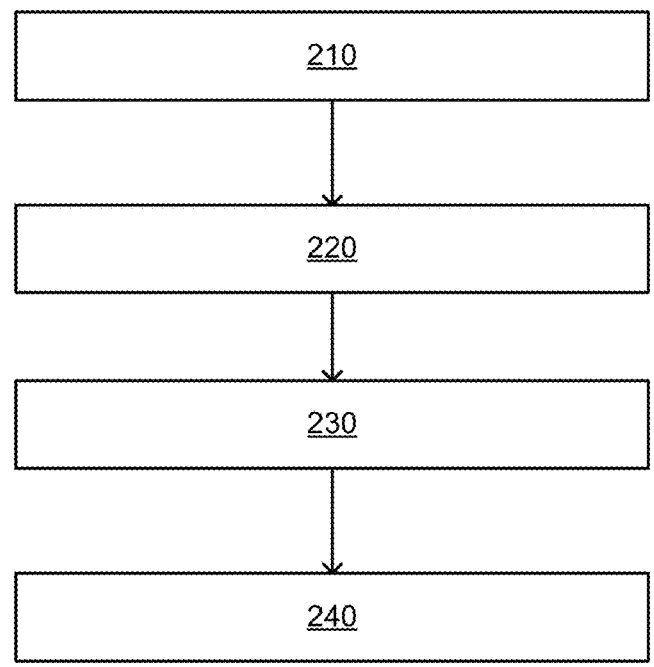
FIG. 8 is an example of a method.

FIG. 8 illustrates an example of a method 200.

Method 200 may include:

a. Step 210 of illuminating, by a radiation source, an object with radiation during consecutive time frames of microsecond-scale duration, wherein radiation emitted during one time frame differs by energy from radiation transmitted during an adjacent time frame.

b. Step 220 of sensing the radiation by radiation sensing elements of multiple CMOS pixel.

c. Step 230 of sampling, for each CMOS pixel of the multiple CMOS pixels, by different in-pixel memory elements of the CMOS pixel, a state of the radiation sensing element during different time frames of the consecutive time frames.

d. Step 240 of reading, by the readout circuits, the in-pixel memory elements of the CMOS pixels during one or more read periods.

The pixel may include a photodiode that is coupled to multiple memory nodes. A combination of a single photodiode and a single memory node is illustrated in U.S. Pat. No. 9,865,632 which is incorporated herein by reference.

Figure 9:
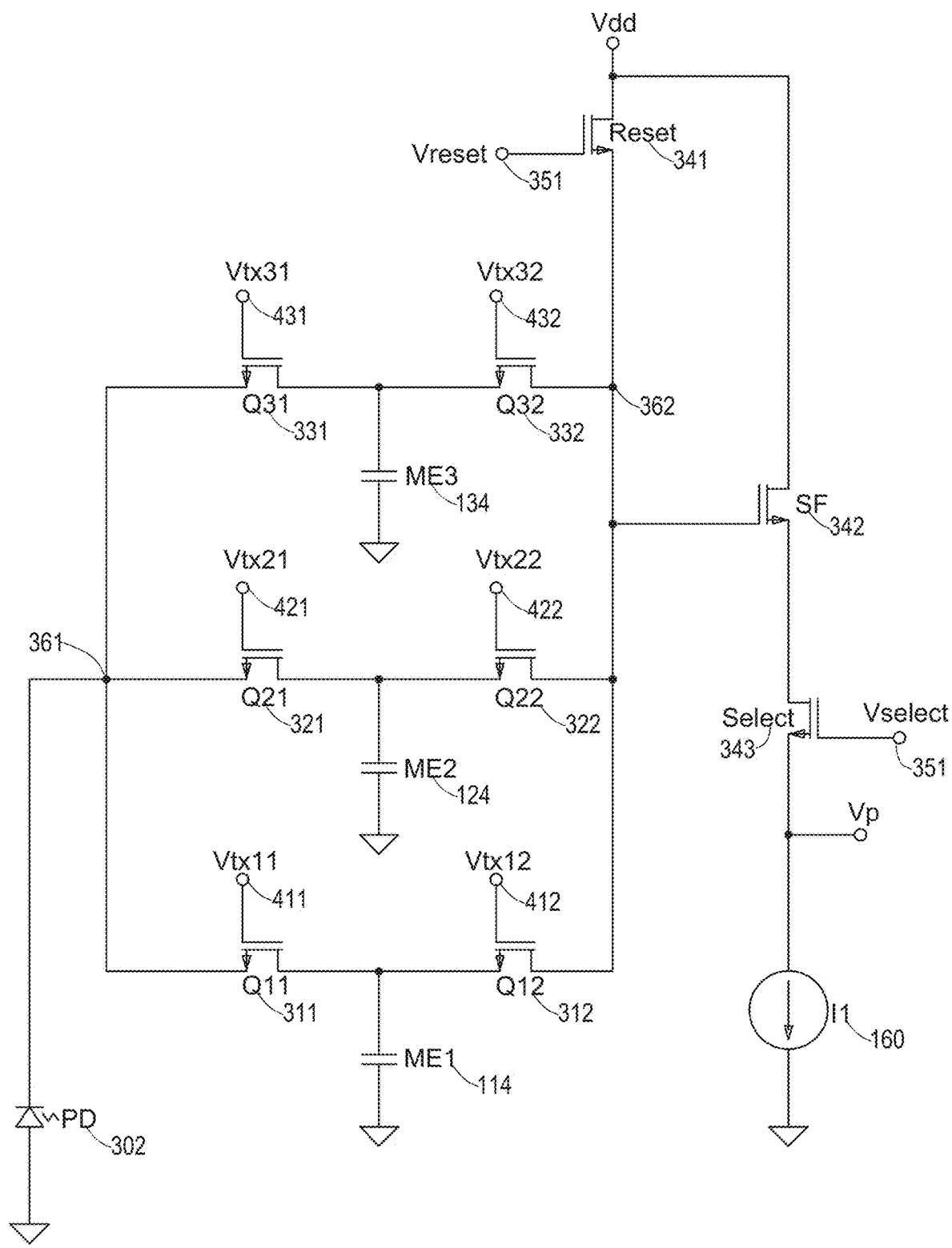
FIG. 9 is an example of a CMOS sensor.

FIG. 9 illustrates a pixel that include three in-pixel memory elements although any number of in-pixel memory elements may be used.

Each in-pixel memory element includes a memory structure that is positioned between two switches. The two switches enable a correlated double sampling read which enables very low noise and thus very high performance. The reading operation of a single memory node is illustrated in U.S. Pat. No. 9,865,632 which is incorporated herein by reference.

FIG. 9 illustrates photodiode 302 that is connected to first node 361. The first node 361 is connected to inputs of three in-pixel memory elements. The three in-pixel memory elements are coupled in parallel to each other. The outputs of the three in-pixel memory elements are connected to second node 362.

The first in-pixel memory element includes first input switch Q11 311, first memory structure 114, and first output switch Q12 312. The first memory structure 114 is coupled between the first input and output switch. A correlated double sampling is applied in order to reach the first memory structure.

The second in-pixel memory element includes second input switch Q21 321, second memory structure 114, and second output switch Q22 322. The second memory structure 114 is coupled between the second input and output switch. A correlated double sampling is applied in order to reach the second memory structure.

The third in-pixel memory element includes third input switch Q31 331, third memory structure 134, and third output switch Q32 332. The third memory structure 134 is coupled between the third input and output switch. A correlated double sampling is applied in order to reach the third memory structure.

First input switch Q11 has a gate that is fed with control signal Vtx11 411.

Second input switch Q21 has a gate that is fed with control signal Vtx21 421.

Third input switch Q31 has a gate that is fed with control signal Vtx31 431.

First output switch Q12 has a gate that is fed with control signal Vtx12 412.

Second output switch Q22 has a gate that is fed with control signal Vtx22 422.

Third output switch Q321 has a gate that is fed with control signal Vtx32 432.

The second node 362 is also coupled to (a) row select switch 343 that is fed by Vselect 352, and (reset switch 341 that is fed by Vreset 351.

Row select switch 343 is also connected to column current source I1 160.

Figure 10:
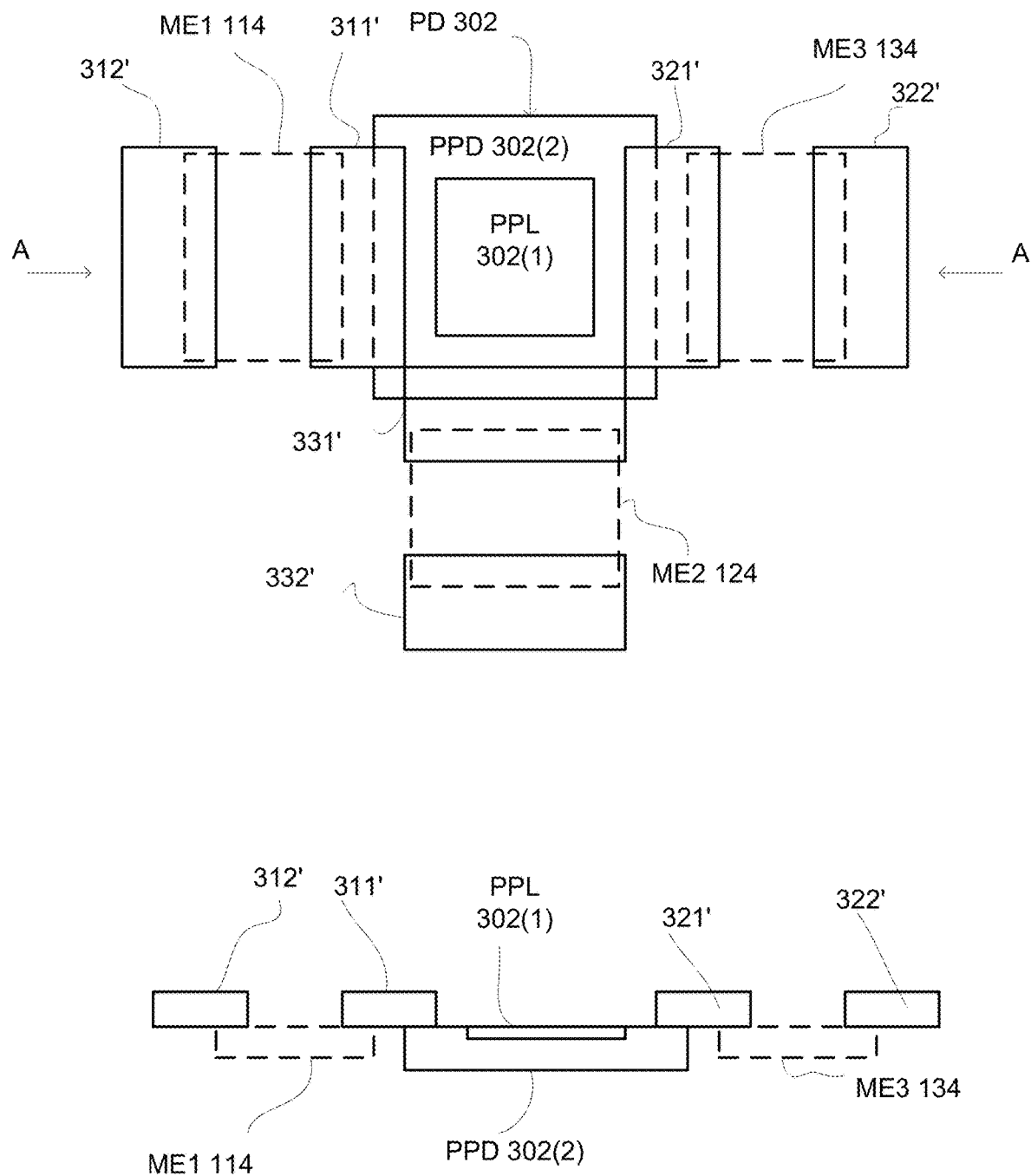
FIG. 10 is an example of a CMOS sensor.

The upper part of FIG. 10 is a top view of a pixel and the lower part of FIG. 10 is a cross sectional view of the pixel.

The pixel includes:
a. Photodiode PD 302 that includes photodiode structure PPD 302(2) and a pinning layer PPL302(1).
b. Gates 311' 321' and 331' of first, second and third input switches (Q11, Q21 and Q31) respectively, that are coupled (via portions of the pixels that are not shown) to PD 302.
c. Gates 312' 322' and 332' of first, second and third output switches (Q12, Q22 and Q32) respectively.
d. Memory structures ME1 114, ME2 132 and ME3 134. First memory structure ME1 114 is coupled (via a portion of the pixel that is not shown) between first input switch and first output switch. Second memory structure ME1 124 is coupled (via a portion of the pixel that is not shown) between second input switch and second output switch.
e. Third memory structure ME3 434 is coupled (via a portion of the pixel that is not shown) between third input switch and third output switch.

Figure 11:
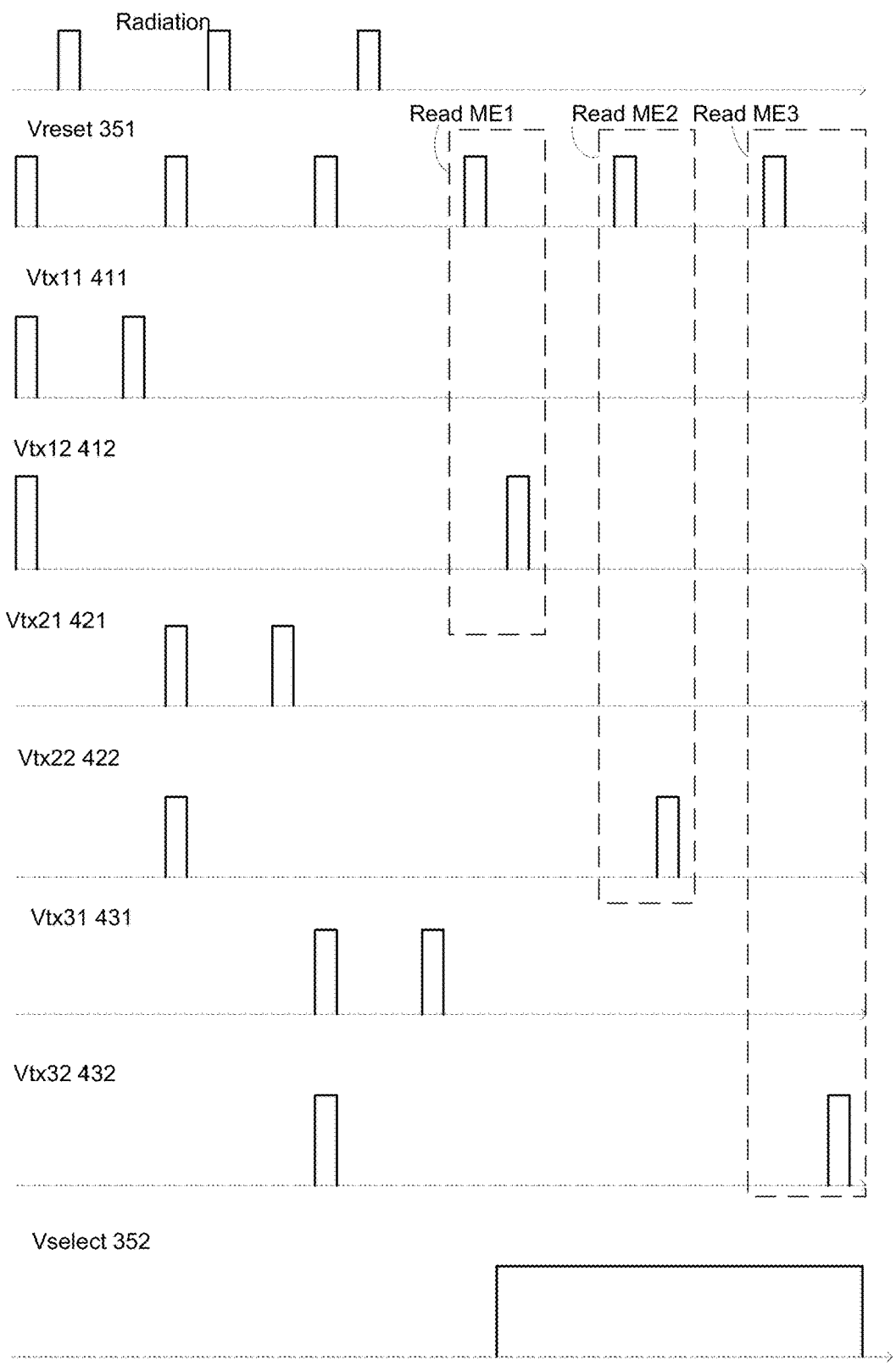
FIG. 11 is an example of a timing diagram.

FIG. 11 is a timing diagram.

During a sampling process, each in-pixel memory element (a) has its input and output switch reset—before the reception of the related radiation pulse, (b) after the related radiation pulse—has its input switch opened for a short duration.

During a read process, and for each in-pixel memory element, the reset switch is opened (for a short duration) and after a short while the output switch of the in-pixel memory element is opened.

The select switch is opened (Vselect is set) when the certain pixel is read.

Any reference to any of the terms "comprise", "comprises", "comprising" "including", "may include" and "includes" may be applied to any of the terms "consists", "consisting", "consisting essentially of". For example—any of the rectifying circuits illustrated in any figure may include more components that those illustrated in the figure, only the components illustrated in the figure or substantially only the components illustrate din the figure.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system comprising:
   a radiation source that is constructed and arranged to illuminate an object with radiation during consecutive time frames of microsecond-scale duration, wherein radiation emitted during one time frame differs by energy from radiation transmitted during an adjacent time frame; and a CMOS sensor that comprises a readout circuit and CMOS pixels;

wherein each CMOS pixel comprises a radiation sensing element and in-pixel memory elements;

wherein each CMOS pixel comprises an in-pixel current source that is constructed and arranged to supply current to the different in-pixel memory elements only during (a) reset periods of the CMOS pixel, and (b) a sampling of the state of the radiation sensing element by each of the in-pixel memory elements;

wherein different in-pixel memory elements are constructed and arranged to sample a state of the radiation sensing element during different time frames of the consecutive time frames; and wherein the readout circuits is constructed and arranged to read the in-pixel memory elements of the CMOS pixels during one or more read periods.

2. The system according to claim 1 wherein the radiation source is constructed and arranged to illuminate the object by spaced apart radiation pulses, one radiation pulse per time frame.

3. The system according to claim 1 wherein the radiation source is constructed and arranged to illuminate the object by a ramp of changing energy levels during the consecutive time frames.

4. The system according to claim 1 wherein the radiation is an x-ray radiation.

5. The system according to claim 1 wherein the radiation differs from x-ray radiation.

6. The system according to claim 1 wherein the in-pixel current source has a control gate for selectively activating and deactivating the in-pixel current source.

7. The system according to claim 6 wherein the CMOS sensor is constructed and arranged to deactivate each in-pixel current source during periods that differ from the reset periods of the CMOS pixel, and differ from the sampling of the state of the radiation sensing element by each of the in-pixel memory elements.

8. The system according to claim 7, wherein the CMOS sensor comprises one or more column current sources that are construed and arranged to supply current to each column of CMOS pixels while CMOS pixels of the column of CMOS pixels are read.

9. The system according to claim 8, wherein each column current source is constructed and arranged to supply a column current that is stronger by a factor of at least one hundred than a current supplied by each in-pixel current source.

10. The system according to claim 1 wherein the in-pixel memory elements are coupled in parallel to each other; and wherein each in-pixel memory element comprises an input capacitor and an output switch.

11. The system according to claim 10 wherein each pixel further comprises (a) an input switch that is coupled between the radiation sensing element and the in-pixel memory elements; (b) a reset branch that is coupled in parallel to the in-pixel memory elements, and (c) an linear amplifier.

12. The system according to claim 11 wherein the linear amplifier comprises an amplifier CMOS transistor; wherein a gate of the amplifier CMOS transistor is coupled to an output of the input switch, to an input of the reset branch, and to inputs of the in-pixel memory elements; and wherein a drain or a source of the amplifier CMOS transistor is coupled to outputs of the memory elements, to an output of the reset branch and to the in-pixel current source.

13. The system according to claim 1 wherein the readout circuit is constructed and arranged to perform interleaved reading of (a) the in-pixel memory elements of the CMOS pixels and of (b) the CMOS pixels when the in-pixel memory elements are disconnected.

14. The system according to claim 1 wherein each in-pixel memory element comprise a memory structure that is coupled between independently controlled input switch and output switch.

15. A CMOS sensor comprising multiple CMOS pixels, one or more column current sources, and a readout circuit; wherein each CMOS pixel comprises a radiation sensing element, an in-pixel current source, and in-pixel memory elements;

wherein for each CMOS pixel, different in-pixel memory elements are constructed and arranged to sample a state of the radiation sensing element during different time frames of consecutive time frames of micro-second scale duration;

wherein for each CMOS pixel, the in-pixel current source is constructed and arranged to supply current to the different in-pixel memory elements only during (a) reset periods of the CMOS pixel, and (b) a sampling of the state of the radiation sensing element by each of the in-pixel memory elements;

wherein the readout circuits is constructed and arranged to read the in-pixel memory elements of the CMOS pixels during one or more read periods;

wherein the one or more column current sources that are construed and arranged to supply current to each column of CMOS pixels while CMOS pixels of the column of CMOS pixels are read; and wherein the CMOS sensor is constructed and arranged to deactivate each in-pixel current source during the one or more read periods.

16. The CMOS sensor according to claim 15, wherein each column current source is constructed and arranged to supply a column current that is stronger by a factor of at least one hundred than a current supplied by each in-pixel current source.

17. A method for acquiring multiple images of an object, the method comprises:

illuminating, by a radiation source, an object with radiation during consecutive time frames of microsecond-scale duration, wherein radiation emitted during one time frame differs by energy from radiation transmitted during an adjacent time frame;

sensing the radiation by radiation sensing elements of multiple CMOS pixel;

for each CMOS pixel of the multiple CMOS pixels, sampling, by different in-pixel memory elements of the CMOS pixel, a state of the radiation sensing element during different time frames of the consecutive time frames; supplying, by an in-pixel current source of each CMOS pixel, supply current to the different in-pixel memory elements of the CMOS pixel only during (a) reset periods of the CMOS pixel, and (b) a sampling of the state of the radiation sensing element by each of the in-pixel memory elements and reading, by the readout circuits, the in-pixel memory elements of the CMOS pixels during one or more read periods.

18. The method according to claim 17 comprising deactivating, by each CMOS pixel, each in-pixel current source during periods that differ from the reset periods of the CMOS pixel, and differ from the sampling of the state of the radiation sensing element by each of the in-pixel memory elements.

19. The method according to claim 18, comprising supplying, to each column of CMOS pixels, current from a column current source during a reading of CMOS pixels of a column of CMOS pixels.

* * * * *